Dec. 20, 1966     D. P. EDKINS     3,292,864
THRUST REVERSER AND DEFLECTOR
Filed Jan. 21, 1965
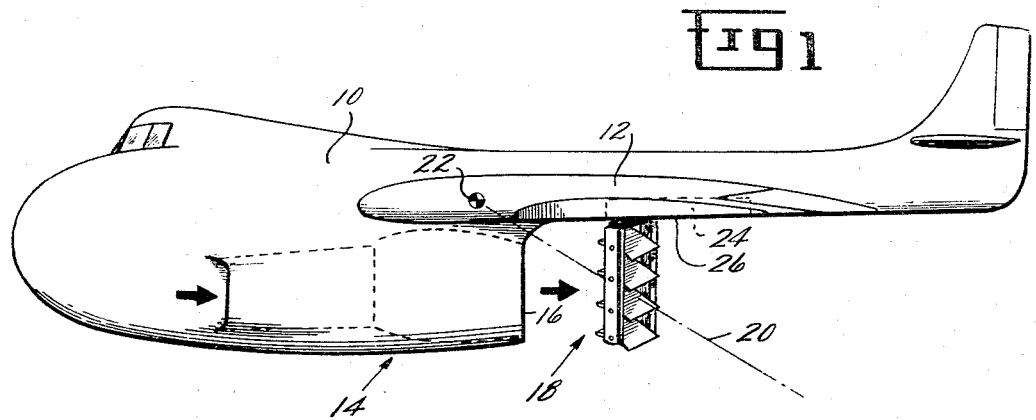
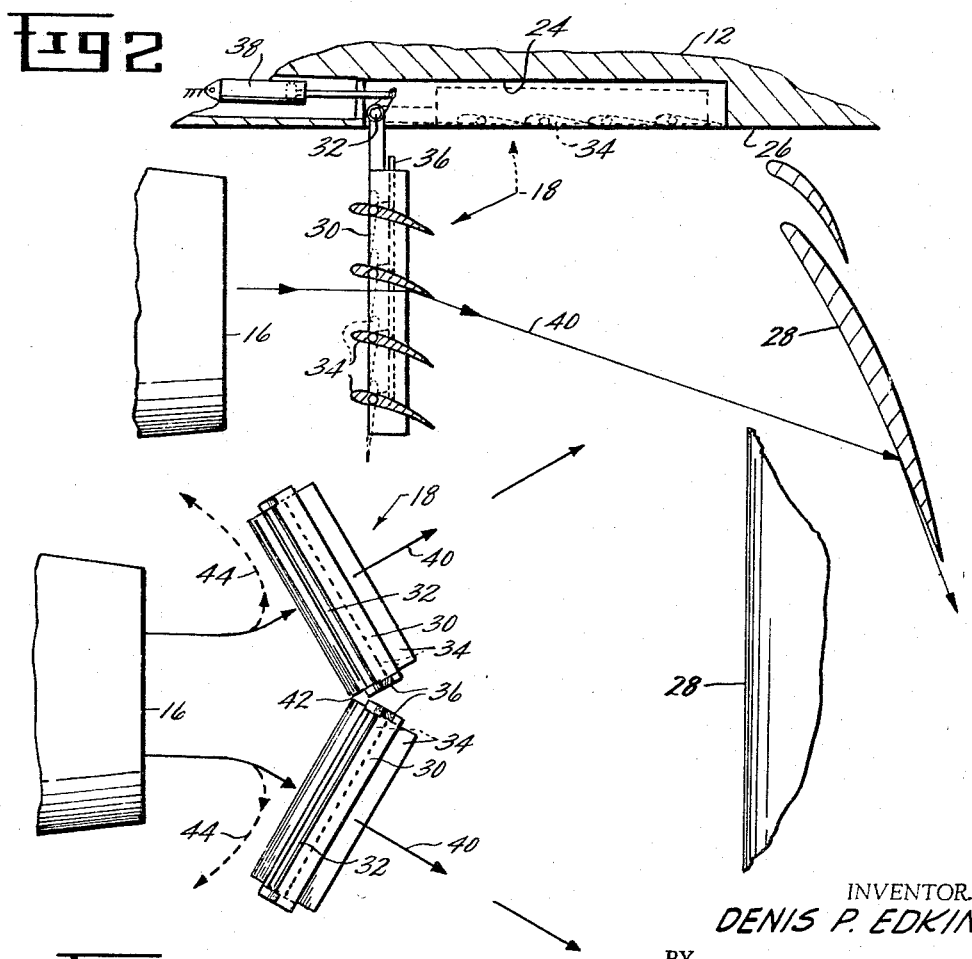
INVENTOR.
DENIS P. EDKINS
BY
ATTORNEY

United States Patent Office 3,292,864
Patented Dec. 20, 1966

3,292,864
THRUST REVERSER AND DEFLECTOR
Denis Pierpoint Edkins, Lynnfield, Mass., assignor to General Electric Company, a corporation of New York
Filed Jan. 21, 1965, Ser. No. 426,794
8 Claims. (Cl. 239—265.19)

The present invention relates to thrust reverser and deflecting mechanism and, more particularly, to reverser and deflecting mechanism that is especially adaptable to single engine applications using high bypass ratio turbofan powerplants.

High bypass ratio turbofan powerplants are generally considered those having bypass ratios of 4 to 1 and above. These powerplants are attractive for V/STOL aircraft operations because they have very high static thrust and excellent specific fuel consumption—SFC—approaching that of a turboprop powerplant. Consequently an aircraft so equipped has high thrust that may be used for VTOL or STOL operation and excellent specific fuel consumption at cruise conditions.

In the larger diameter cruise fan type of turbofan engine it is desired to get VTOL capability from the engine and it has been proposed that the cruise fan be rotated as one means of accomplishing this. However, there are installations where it is impractical or impossible to rotate the nacelle.

A very flexible powerplant is one which is capable of efficient V/STOL operation as well as conventional operation for those applications where long runways are available. In such conventional operation, it is possible to carry more load at takeoff conditions. Thrust reversal is necessary for conventional aircraft operation to bring the aircraft to a halt after landing. Under VTOL operation only, thrust reversal is normally not required. However, in achieving short takeoff and landing—STOL—it becomes essential to provide for thrust deflection of the powerplant so that the aircraft can be airborne at a speed lower than the wing stall speed. When such provision is made, it is usually found that the aircraft becomes landing-limited meaning that it requires a long distance to stop. In order to achieve a comparable landing distance to the takeoff distance it is necessary to use thrust deflection during landing approach and thrust reversal after landing.

As noted above, one of the better powerplants for achieving STOL is the cruise fan which is a high bypass ratio fan which may, in a well known form, employ a tip turbine drive and which provides a large thrust at low speeds relative to cruise thrust. Because of the high bypass ratio the exhaust from such a fan has low temperature and velocity so that it becomes comparatively easy to place devices in the exhaust for deflection and reversal.

The main object of the present invention is to provide a thrust reverser and deflector wherein the same device operates to deflect and then, with no additional structure, is converted into a reverser as applicable.

Another object is to provide such a mechanism which is disposed externally of the powerplant envelope so as not to compromise any aerodynamic features of the powerplant.

A further object is to provide a thrust deflecting mechanism which is inoperable in cruise position to avoid any performance loss in the powerplant.

Another object is to provide a deflecting mechanism which may be installed in the wing of an aircraft or in the fuselage and which uses highly efficient cascades for deflecting the flow to control the direction of thrust from the powerplant and is then converted to a reverser using the same structure.

A further object is to provide a combination reverser and deflecting mechanism wherein the reverser operates to direct the gases to the side of the engine to avoid reingestion problems.

Another object is to provide a thrust deflecting mechanism which may operate in conjunction with the ordinary wing flaps to achieve more efficient turning and STOL operation.

Briefly stated, I provide a thrust reverser and deflecting mechanism that may be used in an aircraft having an ordinary jet engine or conveniently in a high bypass ratio turbofan powerplant. The combined mechanism comprises a support structure, such as an aircraft wing or fuselage, which has a recess therein and the support structure carries the entire powerplant. A pair of frame members is provided and these are pivoted in the recess in the support structure externally and downstream of the powerplant. Each frame member is provided with movable and preferably variable camber louvers to form a cascade. The two cascades are designed to be rotated by actuator means from an inoperative stowed position in the support member where they remain most of the time, into an operative position to intercept the powerplant exhaust. The two cascades are moved down into a vertical plane position so that they abut one another along one edge to form a V or acute angle with the longitudinal axis of the powerplant in plan view with the apex downstream. Means are provided to actuate the cascade louvers from a closed position, in which they act as blockers to reverse and direct the thrust out the side, to an open position wherein the engine exhaust is deflected downwardly, rearwardly, and to the side to provide a large vertical component on the aircraft.

While the specification concludes with claims particularly pointing out and distinctly claiming the subject matter which is regarded as the invention, it is believed the invention will be better understood from the following description taken in connection with the accompanying drawing in which:

FIG. 1 is a side view of a typical single engine aircraft with the reverser and deflector mechanism applied thereto, FIG. 2 is a partial side view of the deflecting mechanism in operation in conjunction with the wing flap, and FIG. 3 is a partial plan view showing the V-orientation of the cascades with the dotted line indicating the stowed position.

For convenience, the invention will be shown and described as it might be applied to an aircraft with a single engine installation employing a tip turbine cruise fan. This is but one form of jet engine powerplant and preferably is a high bypass ratio turbofan. However, the invention is not limited to such a turbofan but is applicable to any well known jet engine powerplant. The term "high bypass ratio" is intended to encompass those turbofan powerplants wherein the ratio of the fan flow to the gas generator flow is 4 to 1 and above. These types of turbofans with thrust deflecting mechanism may commonly be called lift cruise fan powerplants.

Referring first to FIG. 1, there is shown a typical single engine aircraft with which the reverser and deflector mechanism may be efficiently used. Such an aircraft may comprise a fuselage 10 with a wing 12 connected thereto in the usual manner. The aircraft is propelled by any suitable powerplant but preferably by a high bypass ratio turbofan generally indicated at 14 which exhausts through a nozzle 16 for thrust. This is conventional structure and powerplant 14 may be a straight jet engine. Preferably, it is a high bypass ratio turbofan because of the advantages of such a powerplant.

In order to deflect the exhaust gases from powerplant 14 and obtain short takeoff and landing characteristics for the aircraft, there is provided a thrust deflecting mechanism generally indicated at 18. This is designed to be structure that is external of the entire powerplant and downstream so as not to interfere with the aerodynamics thereof. It is movable into position to intersect the exhaust of the powerplant 14 as will be explained. Preferably, the distances and installation are such that the line of action of the deflected thrust along line 20 will pass generally through or near the center of gravity 22 of the aircraft. The whole mechanism may be conveniently stowed in a recess 24 on the undersurface of wing 12 when a wing is so used or in a convenient undersurface of the fuselage if appropriate. In those cases where the wing is used as the storage member, curvature of the parts may not be required and the bottom surface 26 of the wing is provided with the recess 24 as indicated in FIG. 2. In those installations employing high bypass ratio turbofans wherein the exhaust is relatively low temperature it is desirable to provide the recess 24 upstream of the trailing edge of wing 12 with its flaps 28 in order to get more thickness for stowage and for additional turning as will be apparent hereinafter.

In order to provide deflecting structure, each cascade of the pair that is used includes a frame member 30 that is pivoted on an axis 32 disposed in the recess. A pair of these axes 32, one for each cascade, is provided as illustrated in FIG. 3 at an angle to one another for reasons to be described. Each frame member 30 is provided with a plurality of louvers 34 which must be substantially longitudinal and parallel to one another as is shown in FIG. 1 in the operative intersecting deflecting position. The louvers are designed to be turned or moved by any suitable actuating means 36 that moves the louvers from the deflecting position shown in FIG. 2 to the inoperative or stowed position shown dotted in FIG. 2. Thus, the cascades that are formed by the frame members and louvers are stowed in the bottom surface 26 of wing 12 and may form the undersurface in the closed position.

In order to move the cascades into deflecting position, actuator means 38 is provided to rotate the individual cascades into a substantially vertical planar position as shown in FIG. 1 and FIG. 2. As shown in FIG. 2, the individual louvers 34 may conveniently be of the variable camber type to change the direction of deflection. In those cases where variable camber is not required a smaller amount of turning may be obtained by louvers 34 by operating them in conjunction with the wing flaps 28. Thus, the turning is done in steps along the line of thrust 40 and highly efficient turning is obtained.

In order to obtain reverse thrust the same structure may be made to operate as a target type reverser by closure of the louvers when the cascades are in the vertical position of FIG. 2. In this closed position the cascades then act as symmetrical blocker doors.

It is necessary that all the exhaust gas be intercepted without side loads and it is desirable that reingestion problems be avoided during the reverse thrust operation. To this end, a pair of cascades 30, as shown in FIG. 3, is provided for each powerplant and these are arranged so that they pivot down from the supporting wing structure to form a V in plan with the apex downstream as shown. Additionally, the two cascades abut along a vertical line 42 that, in the case of a single powerplant, may have the longitudinal axis, when extended, pass through the apex to completely intercept the flow. In this manner, with the vertical planar position and the abutment along the vertical line in the V form, it will be seen that when the louvers are in closed position in the frame members, the exhaust gas is deflected to the side along line 44 where it is peeled away by the slipstream to avoid reingestion problems. In this mode of operation then, the same deflecting structure is used to provide reversing blocker doors of the target type.

In the deflected thrust position which may be done in two steps as shown in FIG. 2 or may all be deflected through the louvers as may be obtained with variable camber louvers, it will be seen that the lines of deflected thrust 40, as seen in FIG. 3, are equal, balanced and are downwardly, rearwardly and to the side of the powerplant. This permits a large vertical component while still allowing the same structure to be closed down to become a target type reverser. No additional structure is required for blocking purposes and the side deflection results in only a minimum loss in the direct rearward thrust component.

It will be apparent that the combined mechanism provides the same structure for both deflecting purposes and thrust reversal. Additionally, it provides deflected thrust for STOL operation with reversing operation requiring very little or no additional mechanism. The same louver structure may provide a smooth surface when in the closed and stowed position as shown in FIG. 2 without the need for additional doors. The mechanism is especially suitable for the difficult case of single engine aircraft that require thrust deflection. Further, the vertical arrangement of the dual cascades in a V results in balanced discharge to avoid side loads and in discharge to the side which is desired for best control of reingestion by avoiding ground or wing deflection of the gas stream towards the engine inlet.

While there have been described preferred forms of the invention, obvious modifications and variations are possible in light of the above teachings. It is therefore to be understood that within the scope of the appended claims, the invention may be practiced otherwise than as specifically described.

I claim:
1. For use in an aircraft, a jet engine powerplant, thrust reverser and deflecting mechanism comprising,
   a support structure for said entire powerplant,
   a pair of frame members carried in said support structure external of said powerplant,
   movable louvers in each frame member forming a cascade therewith,
   means connected to move said frame members and louvers from said support structure into operative position to form an acute angle with the longitudinal axis of the jet engine and intersect the engine exhaust, and
   means connected to actuate the cascade louvers from closed thrust reversing position to open thrust deflecting position.

2. Apparatus as described in claim 1 wherein said frame members abut in operative position and said acute angle is between said members to form an apex directed downstream.

3. Apparatus as described in claim 2 wherein the louvers are mounted in said frames to extend substantially parallel to one another in intersecting position.

4. Apparatus as described in claim 2 wherein the cascades, in intersecting position, are disposed in substantially vertical operative position and abutting relation and said louvers are substantially longitudinal.

5. For use in an aircraft, a high bypass ratio turbofan powerplant, thrust reverser and deflecting mechanism comprising,
   a support structure having a recess therein and supporting said entire powerplant,
   a pair of frame members pivoted in said support structure recess external of said powerplant,
   movable variable camber louvers in each frame member forming a cascade,
   actuator means connected to rotate said cascades from said support structure into vertical operative position to intersect the turbofan exhaust,
   said cascades abutting on one edge thereof to form an apex directed downstream along a vertical line to form an acute angle with the longitudinal axis of the powerplant, said axis extending through said apex, and
   means connected to actuate the cascade louvers from closed side thrust reversing position to open thrust deflecting position.

6. Apparatus as described in claim 5 wherein the support structure for said cascades is an aircraft wing, flaps in said wing, and said louvers are mounted in said frames upstream of the wing flaps and extend substantially parallel to one another in the intersecting position.

7. Apparatus as described in claim 6 wherein the louvers, when the cascades are in intersecting position, are substantially longitudinal and parallel to another to deflect the exhaust gases downwardly, rearwardly, and to the side of the powerplant when in deflecting position.

8. Apparatus as described in claim 6 wherein each frame is pivoted along an axis disposed in said wing.

References Cited by the Examiner
UNITED STATES PATENTS

| | | | |
|---|---|---|---|
| 2,802,333 | 8/1957 | Price et al. | 60—35.54 |
| 2,866,610 | 12/1958 | Taylor | 60—35.54 X |
| 2,891,740 | 6/1959 | Campbell | 244—12 X |
| 2,929,580 | 3/1960 | Ciolkosz | 244—12 |
| 3,013,751 | 12/1961 | Scott et al. | |
| 3,016,700 | 1/1962 | Howald | 60—35.54 |
| 3,035,792 | 5/1962 | Klapproth | 60—35.6 |
| 3,106,372 | 10/1963 | Kutney | 244—52 X |

MARK NEWMAN, *Primary Examiner.*

CARLTON R. CROYLE, *Examiner.*